(12) United States Patent
Mastrangelo

(10) Patent No.: US 6,405,961 B1
(45) Date of Patent: Jun. 18, 2002

(54) STORAGE ASSEMBLY

(75) Inventor: Dino A. Mastrangelo, Neptune, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/609,350

(22) Filed: Jul. 5, 2000

(51) Int. Cl.$^7$ .............................................. B65H 75/48
(52) U.S. Cl. ................. 242/378.1; 242/378.4; 242/388.1; 242/388.6
(58) Field of Search ........................ 242/378.1, 378.4, 242/388.1, 388.6; 191/12.2 R

(56) References Cited

U.S. PATENT DOCUMENTS 4,796,830 A   1/1989  Gelfman ..................... 242/117
5,078,466 A   1/1992  MacCulloch ................. 385/26
5,544,836 A * 8/1996  Pera ......................... 242/378.1

* cited by examiner

*Primary Examiner*—John Q. Nguyen

(57) ABSTRACT

A storage assembly stores media, such as an optical fiber or the like, such that opposite ends of the media can be independently withdrawn. For example, one end may be withdrawn in one direction, with the second end remaining stationary, and then the second end may be withdrawn in another direction. The ends may be connected with respective network elements or the like for conducting testing or trouble-shooting, for example. When the media is no longer needed for the testing or trouble-shooting, the ends may be retracted back into the storage assembly. The entire unit is lightweight and portable. It can be suspended from above, placed on the floor, or held by a technician. Multiple storage assembly units may be packaged together into a single universal cabinet and secured into an appropriate area in a central office or laboratory environment.

19 Claims, 5 Drawing Sheets

STORAGE ASSEMBLY

BACKGROUND OF THE INVENTION

1. Field of Invention

This invention relates to a storage assembly.

2. Description of Related Art

Handling media such as optical fibers for temporary connections may be cumbersome and can result in damaged media when the media are not handled properly. Thus, improved methods are needed for handling media such as optical fibers and cables.

SUMMARY OF THE INVENTION

This invention provides portable storage techniques that permit opposite ends of a coiled elongate flexible member, such as an optical fiber, for example, to be independently withdrawn from a storage assembly.

A storage assembly includes a first storage space that stores a first portion of the elongate flexible member, a second storage space that stores a second portion of the elongate flexible member such that the first portion is allowed to rotate independent of the second portion, and a connection member that connects the first storage space to the second storage space. The connection member includes a passage in which the first portion is connected to the second portion.

The first and second storage spaces may, for example, each be defined by a peripheral groove of a reel member that is rotatably mounted to a stationary part of the storage assembly, with the passage passing through the stationary part.

These and other features and advantages of this invention are described in or are apparent from the following detailed description of exemplary embodiments.

BRIEF DESCRIPTION OF THE DRAWINGS

This invention will be described in detail with reference to the following figures, wherein like numerals represent like elements, and wherein.

DETAILED DESCRIPTION OF PREFERRED EMBODIMENTS

This invention provides storage techniques that permit opposite ends of a coiled elongate flexible member to be independently withdrawn. For example, one end may be withdrawn in one direction, with the second end remaining stationary, and then the second end may be withdrawn in another direction. The ends may be connected with respective connection points.

For example, the elongate flexible member may be an optical fiber for connecting fiber optic network elements or the like for conducting testing or trouble-shooting, for example, or any type of cable such as coaxial cable, twisted pair, power cord or measuring tape. The elongate flexible member may also be a flat member, such as ribbon-like metal, cloth or plastic material or the like, or a hollow member, such as flexible rubber or vinyl tubing, for example. When the elongate flexible member is no longer needed, the ends of the elongate flexible member may be retracted back into the storage assembly for storage.

According to the storage techniques, a first portion of the elongate flexible member is stored in a first storage space and a second portion of the elongate flexible member is stored in a second storage space that is connected to the first storage space by a connection member that includes a passage. The second portion is connected to the first portion in the passage and is allowed to rotate independent of the first portion.

Figure 1:
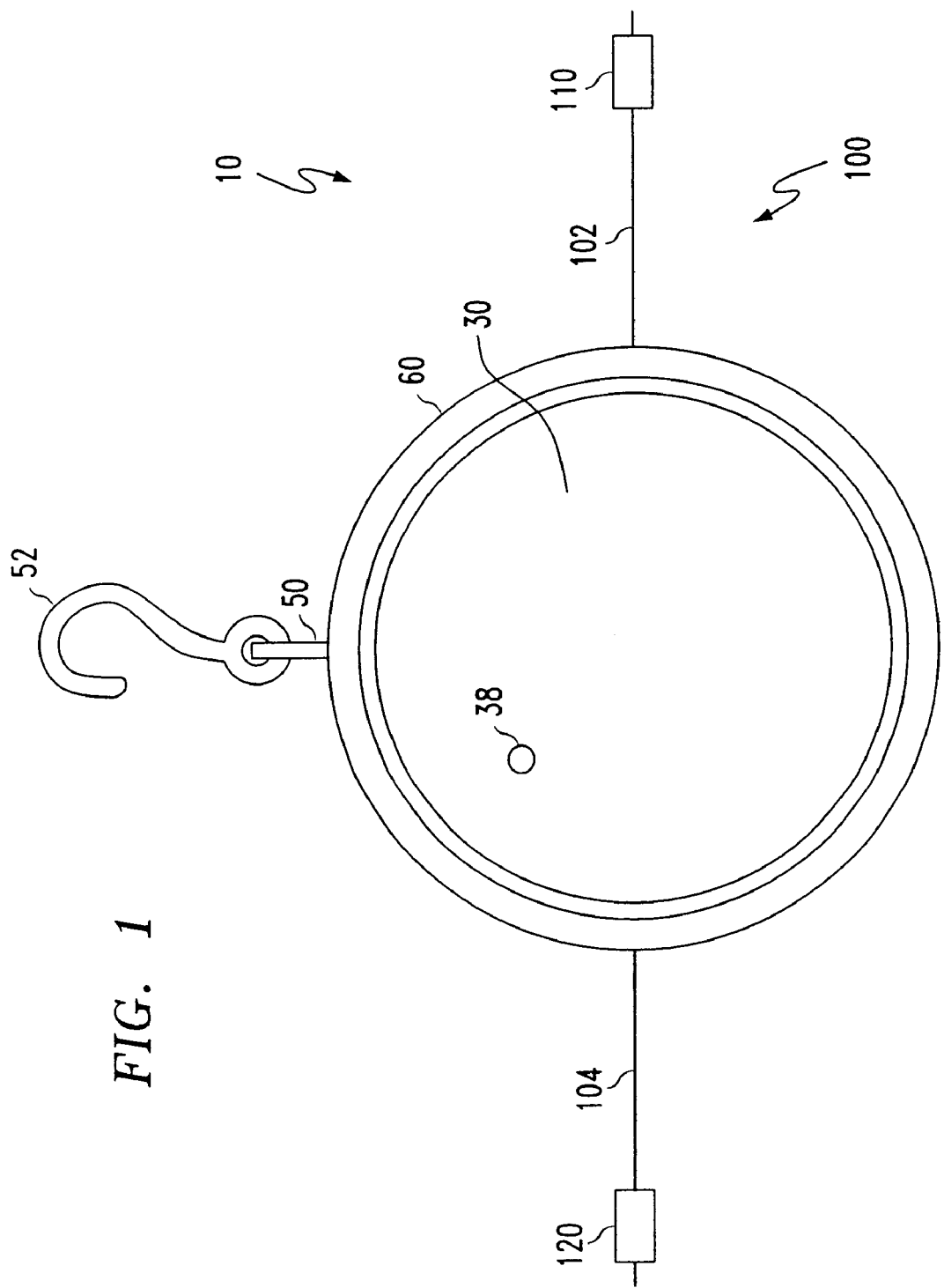
FIG. 1 is a diagram of an exemplary storage assembly.

FIG. 1 is a diagram of a storage assembly 10 that stores media 100. The media 100 may, for example, be an optical fiber, and the optical fiber may be encased in a protective sheathing. Ends 102 and 104 of the media 100 extend from the storage assembly 10 in opposite directions.

Connectors 110 and 120 may be attached to media ends 102 and 104, respectively. When the media 100 is an optical fiber, the connectors 110 and 120 may be, for example, ST-II connectors.

The storage assembly 10 preferably has a suspending device, such as a hook 52, attached via a connection point 50 so that the storage assembly 10 may be suspended from above. Alternatively or additionally, legs (not shown) may be provided on the storage assembly 10 so that it can stand on a floor while ends 102 and 104 of the media 100 are withdrawn and retracted.

Figure 2:
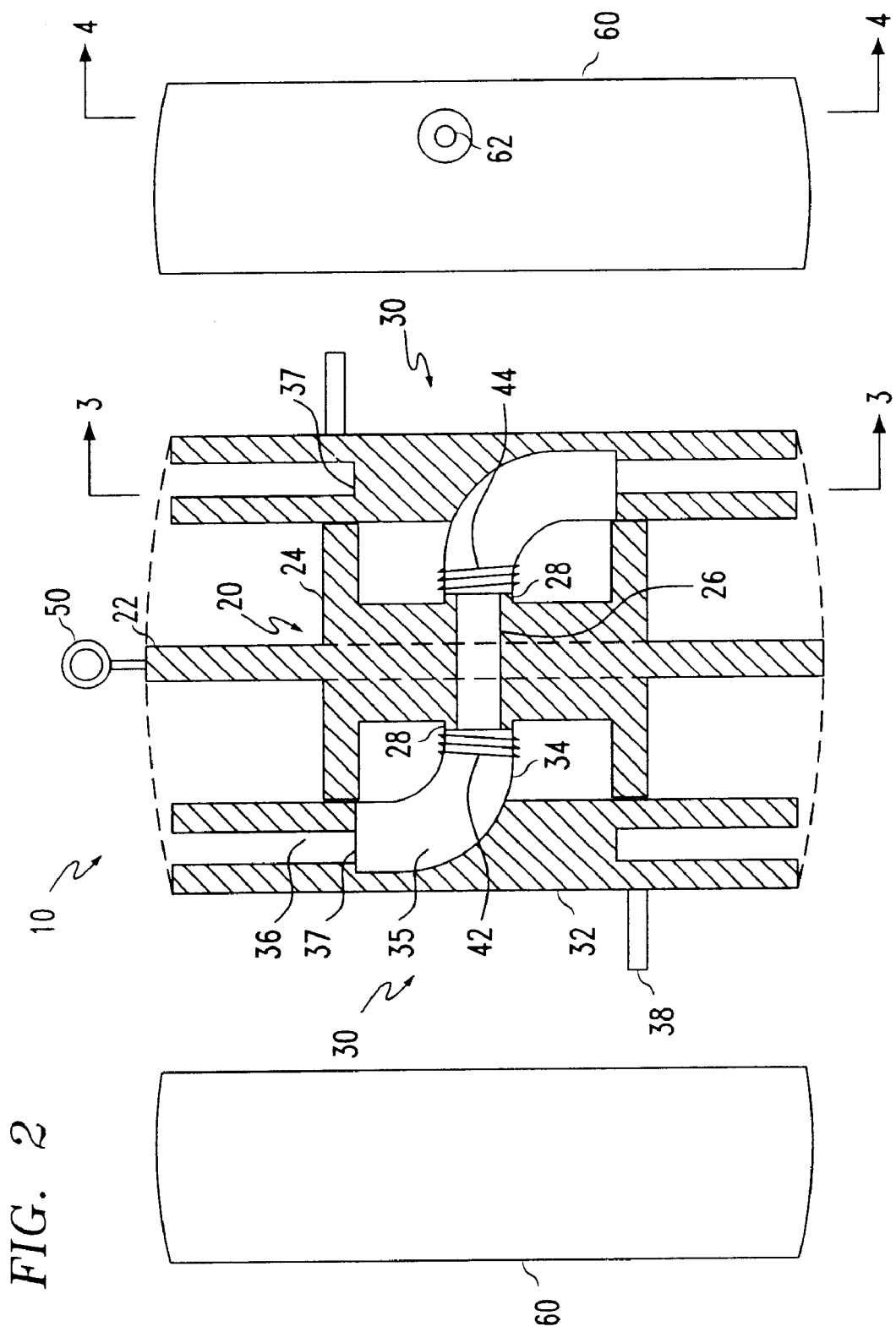
FIG. 2 is a cross-sectional view of an exemplary internal mechanism of the storage assembly of FIG. 1, with housing members of the storage assembly shown at detached positions.

FIG. 2 is a cross-sectional view of an internal mechanism of the storage assembly 10, with housing members 60 of the storage assembly 10 shown at detached positions. When assembled, the housing members 60 are in the dashed-line positions shown in FIG. 2, and are attached to an attachment flange 22 of a core unit 20 by any suitable method, such as by fasteners, such as screws or the like (not shown), by adhesive, by plastic welding or by snap fittings or the like.

The core unit 20 includes mounting hubs 28, through which reel members are mounted as described below. A passage 26 passes through a main body portion 24 and through the hubs 28 of the core unit 20. The passage 26 has a diameter large enough to allow the media 100 (FIG. 1) to pass through and rotate freely within the passage 26.

Two reel members 30, which may be identical in shape, are provided at opposite sides of the core unit 20. Each reel member 30 has a reel body 32, and an annular groove 36 extending inward from a periphery of the reel body 32. Each annular groove 36 is preferably large enough to accommodate at least fifty feet of coiled media 100. A hollow connection member 34 is attached to the reel body 32. The hollow connection member 34 of each reel member 30 is rotatably connected to a respective hub 28, and aligned with the passage 26 of the core unit 20.

Each hollow connection member 34 is in communication with a reel passage 35 that extends to the annular groove 36 of the reel member 30. Like the passage 26, the hollow connection member 34 and the reel passage 35 each have an opening diameter large enough to allow the media 100 (FIG. 1) to pass through and rotate freely.

The passage 26, the hollow connection members 34 and the reel passages 35 together form a continuous passage from the annular groove 36 of one reel member 30 to the annular groove 36 of the other reel member 30. The media 100 is threaded through this continuous passage. Each segment of the continuous passage should have a diameter that facilitates threading the media 100 through the continuous passage. For example, when the media 100 is an optical fiber, each segment of the continuous passage should have a diameter of approximately ½" or more. Furthermore, the transitions between different portions of the continuous passage should be smooth, gradual transitions, and should be shaped such that the media 100 is never bent at a smaller radius than its minimum bend radius.

After the media 100 is threaded through the continuous passage, the media 100 may be adjusted so that approximately half of its length protrudes from the open end of one reel passage 35 and the other approximately half of its length protrudes from the open end of the other reel passage 35. The protruding portions of the optical fiber are then wound on the respective reel members 30, and ends 102 and 104 of the fiber are inserted through the openings 62 of the housing members 60, and the housing members 60 are attached to the attachment flange 22 of the core unit 20 as described above.

A crank knob 38 may be provided on an outside surface of each reel member 30, offset from the axial center of the reel member 30. A user may grasp the crank knob 38 and rotate (left or right) the reel member 30 relative to the core unit 20.

Springs 42 and 44 may be included to provide a relative rotational bias between the reel members 30 and the core unit 20. These springs 42 and 44 are preferably wound in the same direction with respect to the axis of rotation of the reel members 10 so that they bias the reel members 30 in a same direction relative to the core unit 20, for reasons that will be discussed below. However, depending upon various factors, also discussed below, the springs 42 and 44 may be wound in opposite directions so that they bias the reel members 30 in counter-rotating directions. The springs 42 and 44 should have a spring constant that is sufficient to retract all of the media 100 onto the reel members 30, but that does not impose an excessive force on the media 100, since an excessive force may damage the media 100. Furthermore, it should be appreciated that, when crank knobs 38 are provided as described above, it is possible to omit the springs 42 and 44. Alternatively, the crank knobs 38 may serve as a back-up to the springs 42 and 44 in case of breakage or loss of resilience of the springs 42 and 44.

Figure 3:
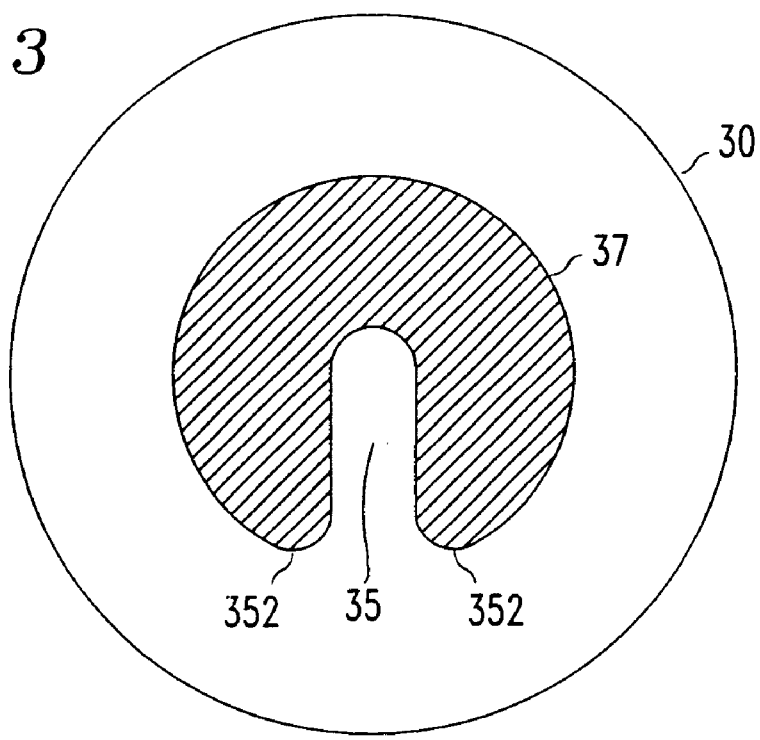
FIG. 3 is a sectional view along line 3—3 of FIG. 2.

FIG. 3 is a sectional view along line 3—3 of FIG. 2, and shows details of the reel passage 35. One or more rounded transitions 352 are provided between the reel passage 35 and a reel seat 37 on which the media 100 is wound. The rounded transitions 352 prevent the media 100 from being bent at a smaller radius than its minimum bend radius. The media 100 passes through the reel passage 35 and is wound around the reel seat 37.

Figure 4:
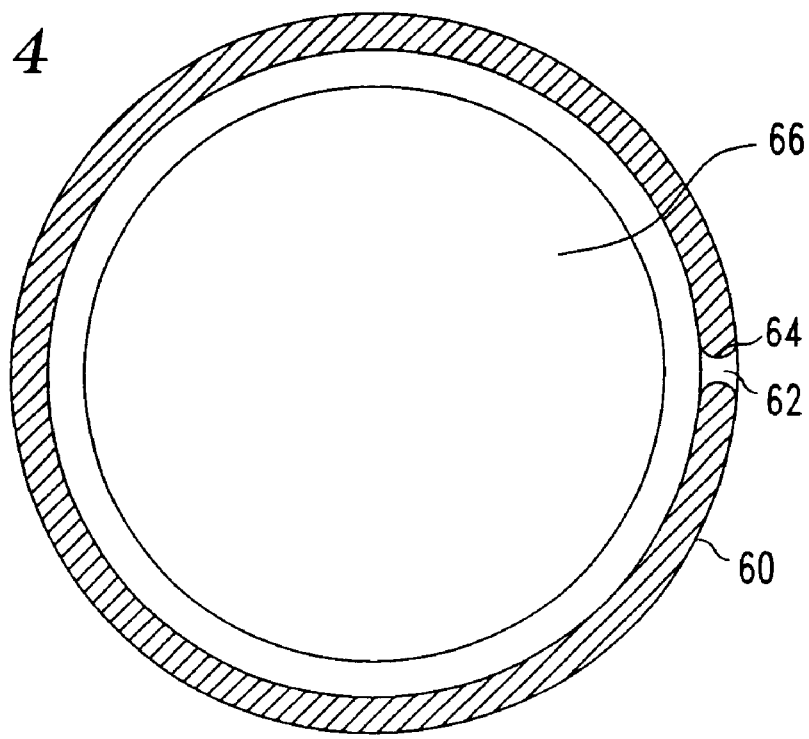
FIG. 4 is a sectional view along line 4—4 of FIG. 2.

FIG. 4 is a sectional view along line 4—4 of FIG. 2, and shows details of the housing members 60. Each housing member 60 preferably has a reel opening 66 that exposes a side surface of the respective reel member 30. This allows the above-described crank knobs 38 to be attached to the reel members 30 and manipulated by an operator to turn the reel members 30.

Each housing member 60 has an opening 62 through which the media 100 passes, as described above. Each opening 62 has rounded edges 64 to prevent the media 100 from being bent at a smaller radius than its minimum bend radius. If necessary or desirable, additional structure, such as curved guides or the like (not shown), can be provided in the vicinity of the opening 62 to prevent the media 100 from being bent at a smaller radius than its minimum bend radius. The housing members 60 may also contain or support other structure, such as a wiping or cleaning device (not shown) that wipes or cleans the media 100 as it travels in and out of the storage assembly 10.

After the media 100 has been wound onto the reel members 30 as described above and the housing members 30 have been attached to the core unit 20, the storage assembly 10 may be operated as follows.

An operator grasps the end 102, for example, of the media 100 and pulls, thus withdrawing the end 102 from the storage assembly 10 and causing the media 100 to spool off of a first reel member 30. The operator then connects the connector 110 attached to the end 102 of the media 100 to a desired corresponding connection point on a network element or appropriate test set (not shown).

During the spooling out of the media 100 from the first reel member 30, the portion of the media 100 on the first reel member 30 rotates independent of the portion of the media 100 on the second reel member 30. Therefore, an axial twist is imparted to the media 100 within the continuous passage formed by the passage 26 and the reel passages 35. However, since this twist is distributed over the length of the continuous passage, the media 100 is not damaged. When the media 100 is an optical fiber, some optical distortion may occur due to the twist, but this optical distortion may be kept within acceptable limits by, for example, adjusting the length of the continuous passage, the length of the media 100, and/or the diameter of the reel members 30, in particular the diameter of the reel seats 37.

When the media 100 is optical fiber, it may be preferable to allow extra slack of the media 100 within the continuous passage to compensate for the torque of media 100 that occurs when only one end of the media 100 is extracted from the storage assembly 10 via the corresponding opening 62. However, if the coil springs 42 and 44 are wound in the same direction and an even amount of media 100 is extracted (simultaneously or almost simultaneously) in opposite directions, the media 100 will not be subjected to significant torque in the continuous passage.

After the end 102 of the media 100 has been pulled out to the desired length and the connector 110 has been attached as described above, the operator may pull the other end 104 out of the storage assembly 10, thus withdrawing the end 104 from the storage assembly 10 and causing the media 100 to spool off of the second reel member 30. The operator may then attach the connector 120 to a desired corresponding connector (not shown).

Here, it can be appreciated that, if the length of the media 100 that is wound on the second reel member 30 is wound in the same direction as the length of the media 100 wound on the first reel member 30 with respect to the axis of rotation of the reel members 30, the second reel member 30 will rotate in the same direction as the first reel member 30 as the media 100 is spooled out. This will have the effect of decreasing the axial twist that was imparted to the media 100 within the continuous passage due to the rotation of the first reel member 30. Conversely, if the length of the media 100 that is wound on the second reel member 30 is wound in the opposite direction as the length of the media 100 wound on the first reel member 30 with respect to the axis of rotation of the reel members 30, the second reel member 30 will rotate in the opposite direction from the first reel member 30 with respect to the axis of rotation. This will have the effect of increasing the axial twist that was imparted to the media 100 within the continuous passage due to the rotation of the first reel member 30, and must be accounted for when determining the length of the continuous passage, the diameter of the reel seats 37 and the like (i.e., the length of the continuous passage and/or the diameter of the reel seats 37 may need to be increased, and/or the length of the media 100 decreased).

Figure 5:
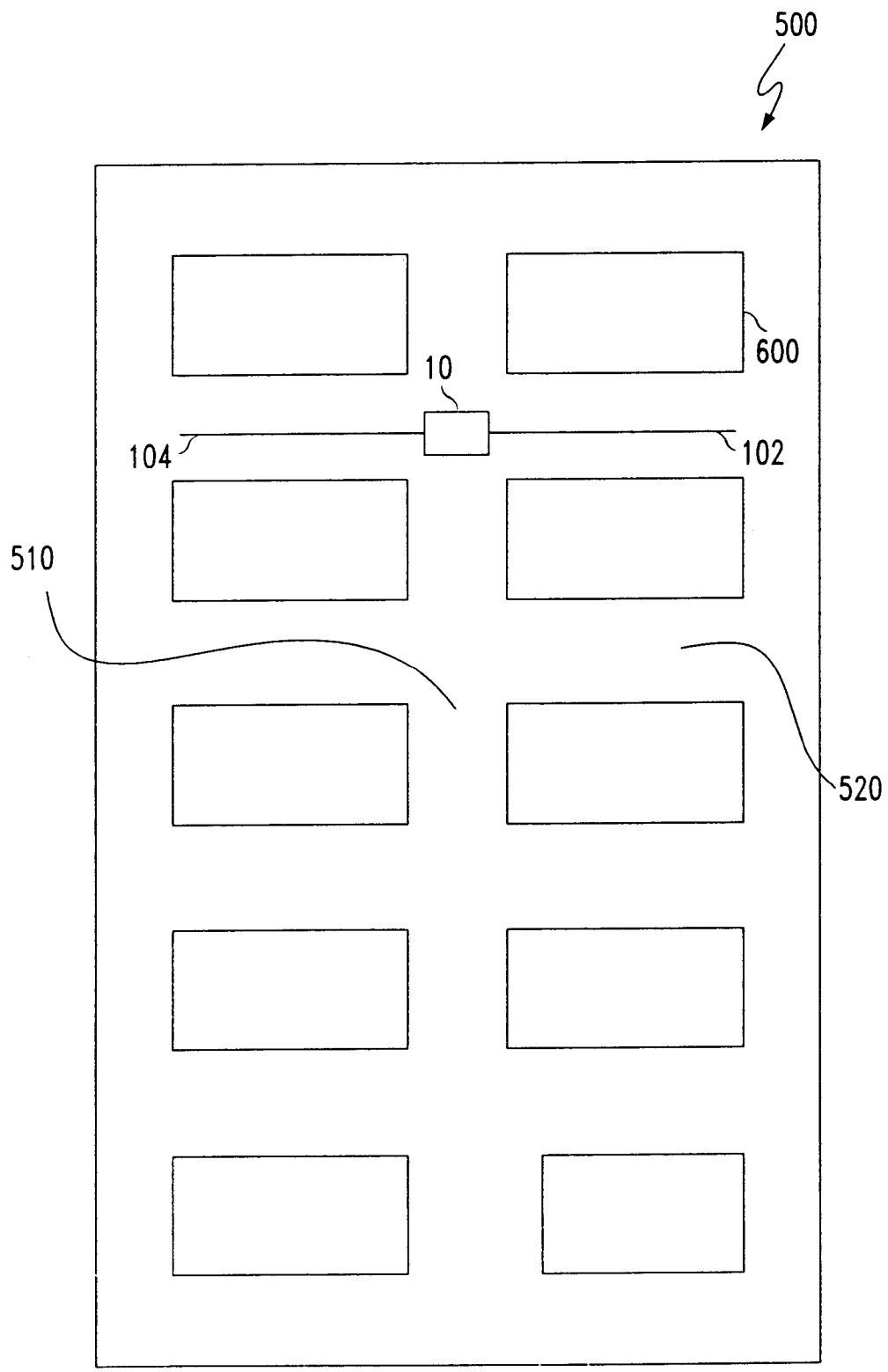
FIG. 5 is a diagram of the storage assembly of FIG. 1 being used among a group of network elements.

FIG. 5 is a diagram of the storage assembly 10 of FIG. 1 being used among a group of network elements 600 in a central office 500. The network elements 600 are arranged on right and left sides of a main corridor 510, and side corridors 520 extend to the sides of the main corridor 510 between the network elements 600.

The storage assembly 10 is placed in the main corridor 510 as shown, either by suspending the storage assembly 10 from above or placing it on the floor, for example, and the ends 102 and 104 of the media 100 are pulled out as described above so that they extend down respective side corridors 520. Suspending the storage assembly 10 from above is preferable in terms of keeping the media 100 up off of the floor and thus less susceptible to damage. The connectors 110 and 120 are then connected appropriately to respective connection points of the network elements 600 for testing, trouble-shooting or the like.

A central office, such as the central office 500 described above, often has network elements on the same corridor within a one hundred foot distance of each other. Therefore, if the media 100 has a total length of one hundred feet, and can extend fifty feet in both directions from the center of the main corridor 510, any given two connectors located on opposite network elements 600 can be connected by the storage assembly 10.

Figure 6:
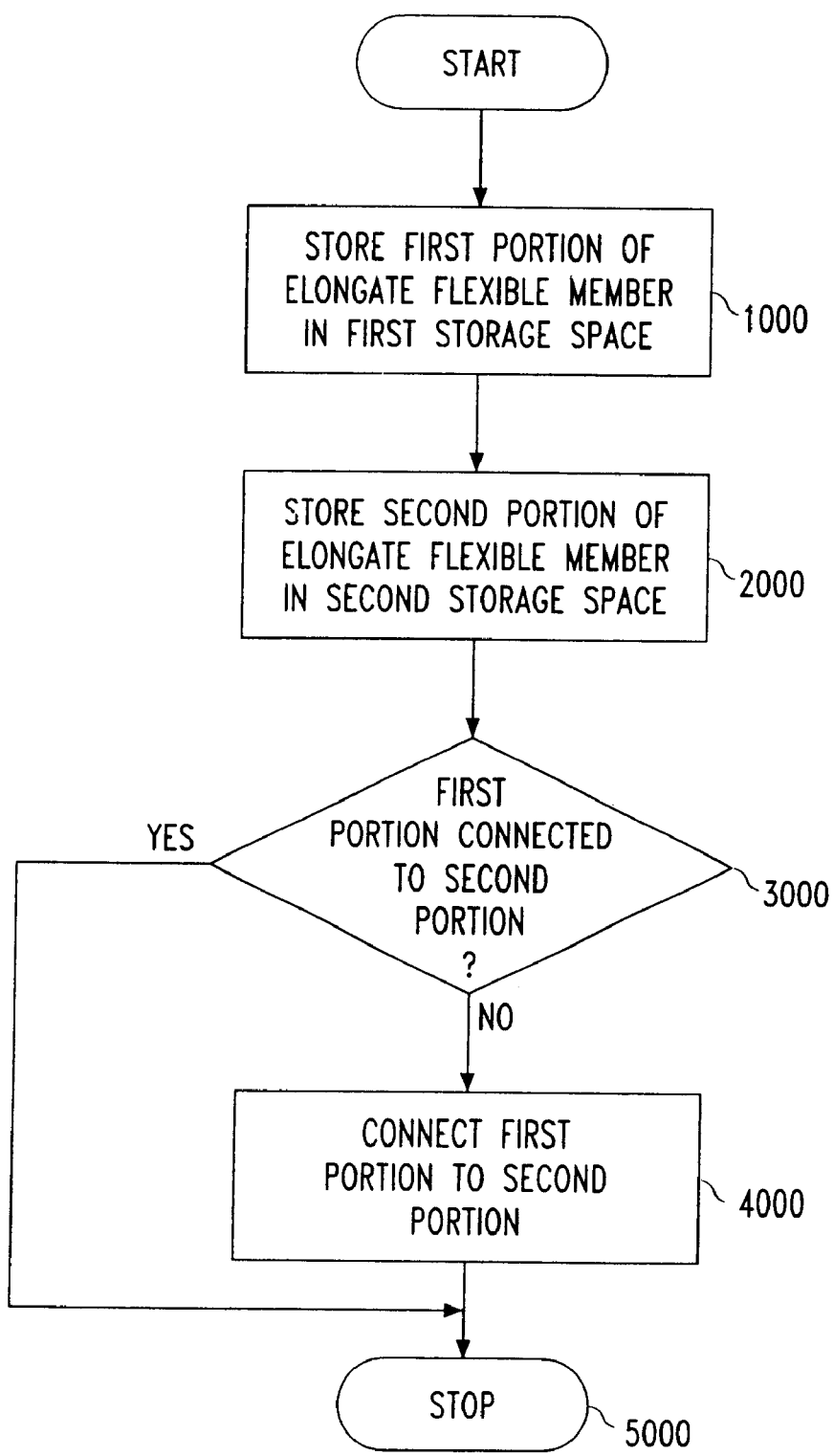
FIG. 6 is a flowchart of an exemplary method for storing an elongate flexible member.

FIG. 6 is a flowchart of an exemplary method for storing an elongate flexible member. In step 1000, the process stores a first portion of an elongate flexible member in a first storage space and goes to step 2000. In step 2000, the process stores a second portion of the elongate flexible member, which is preferably equal to the length of the first portion stored in the first storage space, in a second storage space that is connected to the first storage space by a connection member that includes a passage. The process then goes to step 3000.

In step 3000, the process determines whether the first portion of the elongate flexible member is connected to the second portion of the elongate flexible member. If the first portion is connected to the second portion, the process goes to step 5000 and ends. If the first portion is not connected to the second portion, the process goes to step 4000 and connects the first portion to the second portion. The process then goes to step 5000 and ends.

While the invention has been described in conjunction with the specific embodiments described above, many equivalent alternatives, modifications and variations will become apparent to those skilled in the art once given this disclosure. Accordingly, the exemplary embodiments of the invention as set forth above are considered to be illustrative and not limiting. Various changes to the described embodiments may be made without departing from the spirit and scope of the invention.

For example, in the above description, equal lengths of the media 100 are coiled on each reel member 30. However, it is possible to coil unequal lengths of the media 100 on the reel members 30.

Additionally, in the above description, a continuous media 100 is threaded through a continuous passage and wound on reel members 30. However, a known or later-developed rotary connection may be provided within the storage assembly 10 so that separate optical fibers 100 are wound on the reel members 30 and connected by the rotary connection, such as a rotary optical fiber connection when the media 100 is an optical fiber. This construction would, as in the above-described construction, allow one portion of the media 100 to rotate independent of another portion of the media 100, and would also eliminate axial twisting of the media 100.

Additionally, in the above description, the media 100 is wound around reel seats 37 of rotary reel members 30. However, a structure may be used in which, rather than being wound on rotary reel members, the media 100 is coiled within cavities on either side of the core unit 20 and retracted into the cavities by coil springs, similar to a carpenter's retractable tape measure of a known construction. This construction would, as in the above-described construction, allow one portion of the media 100 to rotate independent of another portion of the media 100, and would also eliminate axial twisting of the media 100.

Additionally, although a single storage assembly unit was described above, multiple storage assembly units may be packaged together into a single universal cabinet and secured into an appropriate area in a central office or laboratory environment.

What is claimed is:

1. A storage assembly for storing an elongate flexible member, comprising:

a first storage space that stores a first portion of the elongate flexible member;

a second storage space that stores a second portion of the elongate flexible member such that the first portion is allowed to rotate independent of the second portion; and a connection member connecting the first storage space to the second storage space, the connection member including a passage through which the first portion is connected to the second portion;

wherein the first and second storage spaces are each defined by a peripheral groove of a reel member that is rotatably mounted to a stationary part of the storage assembly, and the passage passes through the stationary part.

2. The storage assembly of claim 1, wherein:

the first portion is at least partially withdrawable from the first storage space; and the second portion is at least partially withdrawable from the second storage space.

3. The storage assembly of claim 1, wherein the elongate flexible member comprises an optical fiber, an electrical conductor, a tubular member, or a flat member.

4. The storage assembly of claim 1, further comprising one or more retraction devices that exert a retracting force on the elongate flexible member, the retracting force tending to retract the elongate flexible member into the first and second storage spaces.

5. The storage assembly of claim 4, wherein the one or more retraction devices comprise one or more springs.

6. The storage assembly of claim 1, further comprising at least one minimum radius guide that prevents the flexible elongate member from bending at a radius smaller than a minimum bend radius of the flexible elongate member.

7. The storage assembly of claim 1, further comprising one or more retraction devices that exert a rotation force that rotates the reel members with respect to the stationary part of the storage assembly.

8. The storage assembly of claim 7, wherein the one or more retraction devices comprise one or more of a spring connected between each reel member and the stationary part of the storage assembly and a crank handle attached to an outside surface of each reel member.

9. The storage assembly of claim 1, wherein the passage has a diameter of at least ½".

10. A method for storing an elongate flexible member, comprising:

winding a first portion of the elongate flexible member in a first storage space;

winding a second portion of the elongate flexible member in a second storage space that is connected to the first storage space by a connection member that includes a passage;

permitting the first portion to rotate independently of the second portion along a rotational axis; and threading the elongate flexible member through the passage along the rotational axis.

11. A method of storing an elongate flexible member, comprising:

storing a first portion of the elongate flexible member in a first storage space; and storing a second portion of the elongate flexible member in a second storage space that is connected to the first storage space by a connection member that includes a passage in a stationary member located between the first and second portions, the second portion being connected to the first portion through the passage, wherein the second portion is capable of rotating independently of the first portion and relative to the stationary portion.

12. The method of claim 11, wherein the elongate flexible member is a continuous member, the method further comprising threading the elongate flexible member through the passage until the first elongate flexible member portion is on one side of the passage and the second elongate flexible member portion is on another side of the passage.

13. The method of claim 11, further comprising:

exerting a first force on the first portion that tends to retract the first portion into the first storage space; and exerting a second force on the second portion that tends to retract the second portion into the second storage space.

14. The method of claim 11, further comprising preventing the flexible elongate member from bending at a radius smaller than a minimum bend radius of the flexible elongate member.

15. A method for storing an elongate flexible member, comprising:

winding a first portion of the elongate flexible member in a first storage space;

winding a second portion of the elongate flexible member in a second storage space;

threading the elongate flexible member through a passage in a stationary member located between the first and second storage spaces; and permitting the first portion to rotate independently of the second portion and relative to the stationary member.

16. The method of claim 15, further comprising:

applying a first retracting force to the first portion in the first storage space; and applying a second retracting force to the second portion in the second storage space.

17. The method of claim 15, further comprising preventing the flexible elongate member from bending at a radius smaller than a minimum bend radius of the flexible elongate member.

18. A storage assembly for storing an elongate flexible member, comprising:

a first storage space that stores a first portion of the elongate flexible member;

a second storage space that stores a second portion of the elongate flexible member such that the first portion is allowed to rotate independent of the second portion; and a connection member connecting the first storage space to the second storage space, the connection member including a passage through which the first portion is connected to the second portion;

wherein the first and second storage spaces are each defined by a peripheral groove of a reel member that is rotatably mounted along a rotational axis to a central part of the storage assembly, and the passage passes through the central part along the rotational axis.

19. A method of storing an elongate flexible member, comprising:

storing a first portion of the elongate flexible member in a first storage space;

storing a second portion of the elongate flexible member in a second storage space that is connected to the first storage space by a connection member that includes a passage, the second portion being connected to the first portion in the passage, wherein the second portion is capable of rotating independently of the first portion along a rotational axis; and threading the elongate flexible member through the passage along the rotational axis.

* * * * *